(12) United States Patent
Sakamoto et al.

(10) Patent No.: US 7,580,244 B2
(45) Date of Patent: Aug. 25, 2009

(54) ELECTROCHEMICAL DEVICE AND METHOD FOR MANUFACTURING SAME, AND JIG FOR MANUFACTURING ELECTROCHEMICAL DEVICE

(75) Inventors: Ryuichi Sakamoto, Tokyo (JP); Minoru Takeishi, Tokyo (JP)

(73) Assignee: TDK Corporation, Tokyo (JP)

( * ) Notice: Subject to any disclaimer, the term of this patent is extended or adjusted under 35 U.S.C. 154(b) by 349 days.

(21) Appl. No.: 11/645,025

(22) Filed: Dec. 26, 2006

(65) Prior Publication Data

US 2007/0159769 A1      Jul. 12, 2007

(30) Foreign Application Priority Data

Dec. 26, 2005   (JP) ............................. 2005-373634

(51) Int. Cl.
  *H01G 9/00* (2006.01)
(52) U.S. Cl. ...................................... 361/502; 29/25.03
(58) Field of Classification Search ................ 361/502; 29/25.03
See application file for complete search history.

(56) References Cited

U.S. PATENT DOCUMENTS

| | | | |
|---|---|---|---|
| 5,923,525 A * | 7/1999 | Belyakov et al. ............ | 361/502 |
| 6,201,686 B1 * | 3/2001 | Hiratsuka et al. ............ | 361/502 |
| 6,222,720 B1 * | 4/2001 | Aoki et al. ................ | 361/301.5 |
| 6,413,409 B1 | 7/2002 | Otowa et al. | |
| 6,449,139 B1 * | 9/2002 | Farahmandi et al. ........ | 361/502 |
| 6,603,653 B2 * | 8/2003 | Matsuoka et al. ........... | 361/502 |

FOREIGN PATENT DOCUMENTS

JP    A 2001-93508    4/2001

* cited by examiner

*Primary Examiner*—Eric Thomas
(74) *Attorney, Agent, or Firm*—Oliff & Berridge, PLC

(57) ABSTRACT

An electrochemical device manufacturing jig comprises a first fixing jig having a plurality of fixing pins, for positioning and fixing separators by inserting the plurality of fixing pins in through-holes provided to the separators, a second fixing jig having a plurality of positioning pins, for positioning and fixing collectors by inserting the plurality of positioning pins in through-holes provided to the collectors, and a fixing pin hold-down jig for supporting fixing pins. The first and second fixing jigs can be mated in a direction parallel to the axial direction of the fixing pins and the positioning pins, and this allows the relative positional relationship of the fixing pins and the positioning pins to be fixed.

20 Claims, 18 Drawing Sheets

's surface,

ELECTROCHEMICAL DEVICE AND METHOD FOR MANUFACTURING SAME, AND JIG FOR MANUFACTURING ELECTROCHEMICAL DEVICE

BACKGROUND OF THE INVENTION

1. Field of the Invention

The present invention relates to an electrochemical device and a method for manufacturing this device, and more particularly relates to an electrochemical device having a structure in which separators are alternately laminated with collectors each having a polarizable electrode layer formed on their surface, and to a method for manufacturing this device. The present invention also relates to an electrochemical device manufacturing jig, and more particularly to an electrochemical device manufacturing jig for positioning and alternately laminating collectors and separators.

2. Description of the Related Art

Electrochemical devices such as electric double-layer capacitors have been attracting attention in recent years as batteries that are compact and lightweight and have a relatively large capacity. Electric double-layer capacitors are a type of battery that stores electrical charges directly in electrodes, rather than utilizing a chemical reaction as is the case with ordinary secondary cells, and therefore have the advantage that they can be charged and discharged extremely quickly. This feature holds promise for applications such as backup power sources for portable devices (small electronic devices) and so forth, auxiliary power sources for electric and hybrid vehicles, and so on, and a great deal of research has gone into improving the performance of these capacitors.

The basic structure of an electric double-layer capacitor comprises a plurality of collectors on which a polarizable electrode layer has been formed, alternately laminated with a plurality of separators that separate adjacent polarizable electrode layers. The inside of these collectors is filled with an electrolytic solution. If any misalignment in the lamination position should occur in the lamination of the collectors and separators, the completed integrated body will have a distorted shape, and in some cases problems such as shorting between the positive and negative electrodes can occur, so the lamination must be performed in the proper positions. Therefore, techniques such as image recognition have been used in the past to control the lamination positions.

However, positioning by image recognition not only makes such control more complicated, it also reduces work efficiency. In response to this, Japanese Laid-Open Patent Application 2001-93508 discloses a method in which the lamination positions are controlled by providing positioning through-holes to the positive and negative. electrode plates, and laminating while inserting positioning pins into these through-holes.

As a result of investigation into the method described in Japanese Laid-Open Patent Application 2001-93508, the present inventors discovered that not only is it necessary to form bag-shaped separators ahead of time on the positive or negative electrode plates, but it is also necessary to accurately control the positions where these bag-shaped separators are formed, which is a problem in that production efficiency is low.

Furthermore, a property of an electric double-layer capacitor in which a carbonaceous material or the like is used as the material for a polarizable electrode layer is that the polarizable electrode layer expands by about 10% in its thickness direction during charging. When this expansion occurs, not only does it apply stress to the housing by deformation, but it also increases the internal stress of the electric double-layer capacitor. Consequently, it is necessary to provide a pair of integration fixing plates or the like in the lamination direction of the integrated body that will serve as the capacitor main body, and thereby suppress expansion. Nevertheless, the inventors have discovered that it is difficult to suppress expansion in the center portion after positive and negative electrode plates have been laminated by the method described in Japanese Laid-Open Patent Application 2001-93508.

SUMMARY OF THE INVENTION

The present invention was conceived in an effort to solve this problem, and it is an object thereof to provide an electrochemical device with which separators and collectors having polarizable electrode layers formed on their surface are accurately positioned, and expansion of the polarizable electrode layers can be suppressed, and to provide a method for manufacturing this electrochemical device.

It is another object of the present invention to provide an electrochemical device manufacturing jig with which separators and collectors having polarizable electrode layers formed on their surface are accurately positioned while being alternately laminated, and expansion of the polarizable electrode layers can be suppressed.

The electrochemical device according to the present invention comprises an integrated body produced by alternately disposing a plurality of collectors each having polarizable electrode layers formed on surfaces thereof, and a plurality of separators for separating the adjacent polarizable electrode layers, a pair of integration fixing plates disposed on both sides of the integrated body in a lamination direction, and a plurality of fixing pins that pass through the integrated body and the integration fixing plates, wherein the separators and the collectors have first and second through-holes, respectively, into which the fixing pins are inserted, with the diameter of the second through-holes being larger than that of the first through-holes.

Thus, with the electrochemical device according to the present invention, since fixing pins that position the separators pass through both the separators and the collectors, expansion of the polarizable electrode layers can be effective suppressed by the fixing pins. Furthermore, because the diameter of the second through-holes provided to the collectors is larger than that of the first through-holes provided to the separators, any inter-electrode short circuiting that would be caused by the insertion of the fixing pins can be prevented.

It is preferable with the present invention if the fixing pins are made up of an insulating material. This makes it possible to prevent the short circuiting of the electrodes by the fixing pins.

It is also preferable with the present invention if the separators are in contact with the fixing pins at the inner wall portions of the first through-holes. This allows the separators to be accurately positioned by the fixing pins. In this case, it is preferable if the inner wall portion of the second through-hole and the fixing pin are separated substantially equidistantly all the way around a periphery thereof. This more effectively prevents any inter-electrode short circuiting that would be caused by the insertion of the fixing pins.

The method of the present invention for manufacturing an electrochemical device comprises a first step of positioning and placing the separators with respect to fixing pins by inserting the corresponding fixing pins respectively in a plurality of first through-holes provided to the separators, a second step of positioning and placing collectors each having polarizable electrode layers formed on surfaces thereof with respect to positioning pins by inserting the corresponding fixing pins respectively in a plurality of second through-holes provided to the collectors, and inserting corresponding positioning pins respectively in a plurality of third through-holes provided to the collectors, and a third step of forming a integrated body by alternately repeating the first and second steps, and then compressing and fixing the integrated body by forming heads at ends of the fixing pins.

With the present invention, since the separators are positioned by fixing pin, and the collectors are positioned by positioning pins, the lamination positions of both the separators and the collectors can be accurately controlled.

Here again, it is preferable if the diameter of the second through-holes is larger than that of the first through-holes. This prevents any inter-electrode short circuiting that would be caused by the insertion of the fixing pins.

With the present invention, it is preferable if third through-holes are formed in an extension where no polarizable electrode layer is formed on a surface thereof. This keeps the positioning pins from interfering with the separators. In this case, it is preferable if there is a fourth step of pulling the positioning pins out of the third through-holes and then connecting a collecting bar to the extension.

The electrochemical device manufacturing jig according to the present invention comprises a first fixing jig having a plurality of fixing pins, for positioning and fixing separators by inserting the plurality of fixing pins in through-holes provided to the separators, and a second fixing jig having a plurality of positioning pins, for positioning and fixing collectors by inserting the plurality of positioning pins in through-holes provided to the collectors, wherein the first and second fixing jigs are capable of fixing a relative positional relationship of the fixing pins and the positioning pins by mating in a direction parallel to an axial direction of the fixing pins and the positioning pins.

With the present invention, because the first and second fixing jigs are capable of mating in a direction parallel to the axial direction of the fixing pins and the positioning pins, either the fixing pins or the positioning pins can be pulled out after the fixing pins and positioning pins have been used to laminate the separators and collectors.

Therefore, when free ends of the fixing pins and the positioning pins are on an upper side and fixed ends are on a lower side, if the first and second fixing jigs can be mated such that the first fixing jig is on the upper side and the second fixing jig is on the lower side, just the positioning pins can be pulled out, leaving the fixing pins still inserted, after the fixing pins and positioning pins have been used to laminate the separators and collectors. Accordingly, attachment of the collecting bar and other such work that is performed after lamination can be carried out more easily.

It is preferable with the present invention if the fixing pins can be attached to and removed from the first fixing jig, and are made of an insulating material. This allows expansion of the polarizable electrode layers to be effectively suppressed by the fixing pins.

It is also preferable with the present invention if the second fixing jig includes a first portion provided with some of the plurality of positioning pins, a second portion provided with the rest of the plurality of positioning pins, and a third portion that links the first and second portions, and the first fixing jig has a recess portion that mates with the third portion of the second fixing jig. This makes it possible for the collectors serving as positive electrodes to be positioned by the positioning pins provided to the first portion, and for the collectors serving as negative electrodes to be positioned by the positioning pins provided to the second portion.

Thus, with the present invention, separators and collectors having polarizable electrode layers formed on their surface are accurately positioned, and expansion of the polarizable electrode layers can be suppressed.

DESCRIPTION OF THE PREFERRED EMBODIMENTS

Preferred embodiments of the present invention will now be described in detail through reference to the appended drawings.

First Embodiment

First, a first embodiment of the present invention will be described in detail.

Figure 1:
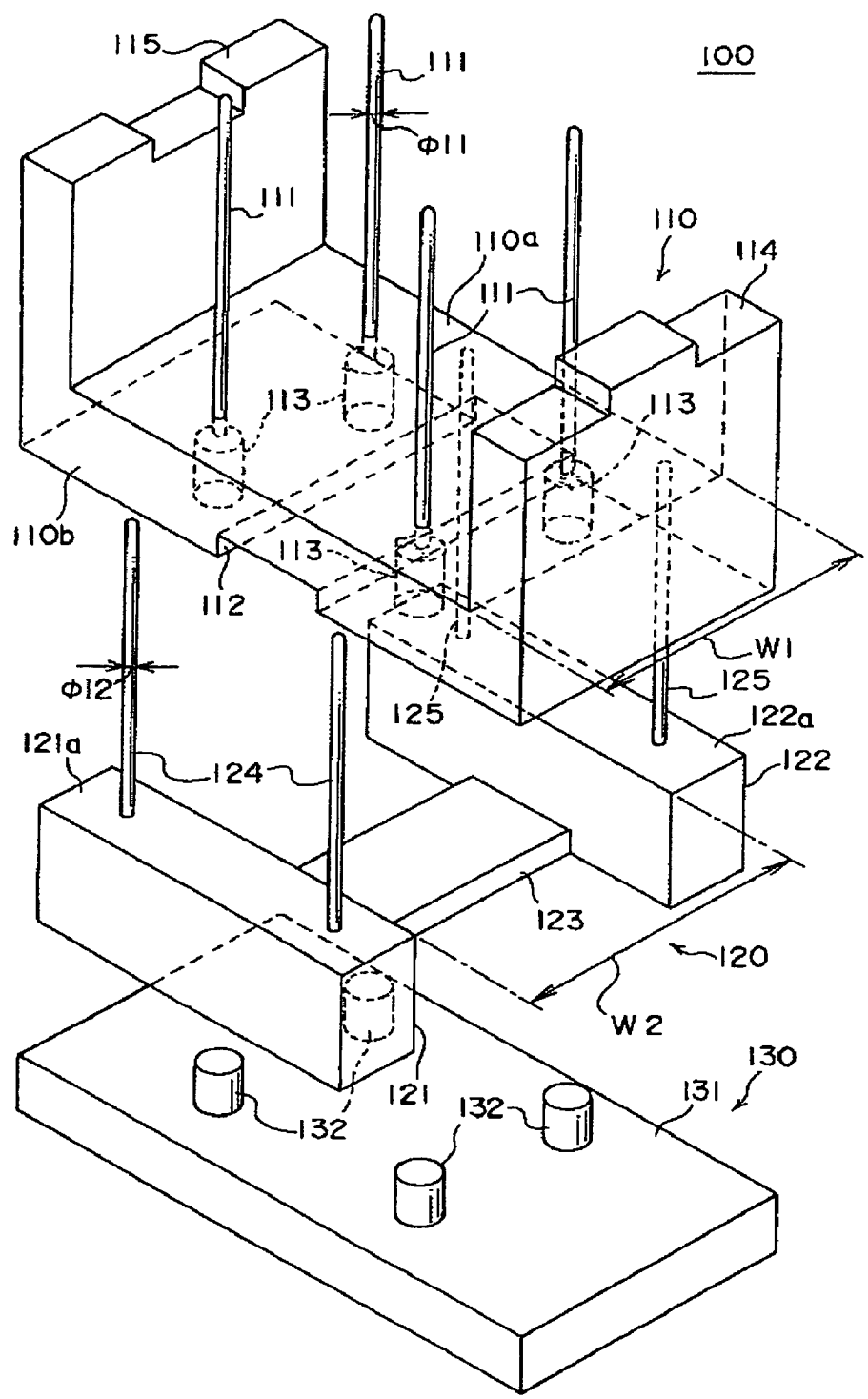
FIG. 1 is a schematic, exploded oblique view of the structure of an electrochemical device manufacturing jig 100 according to a first embodiment of the present invention.
Figure 2:
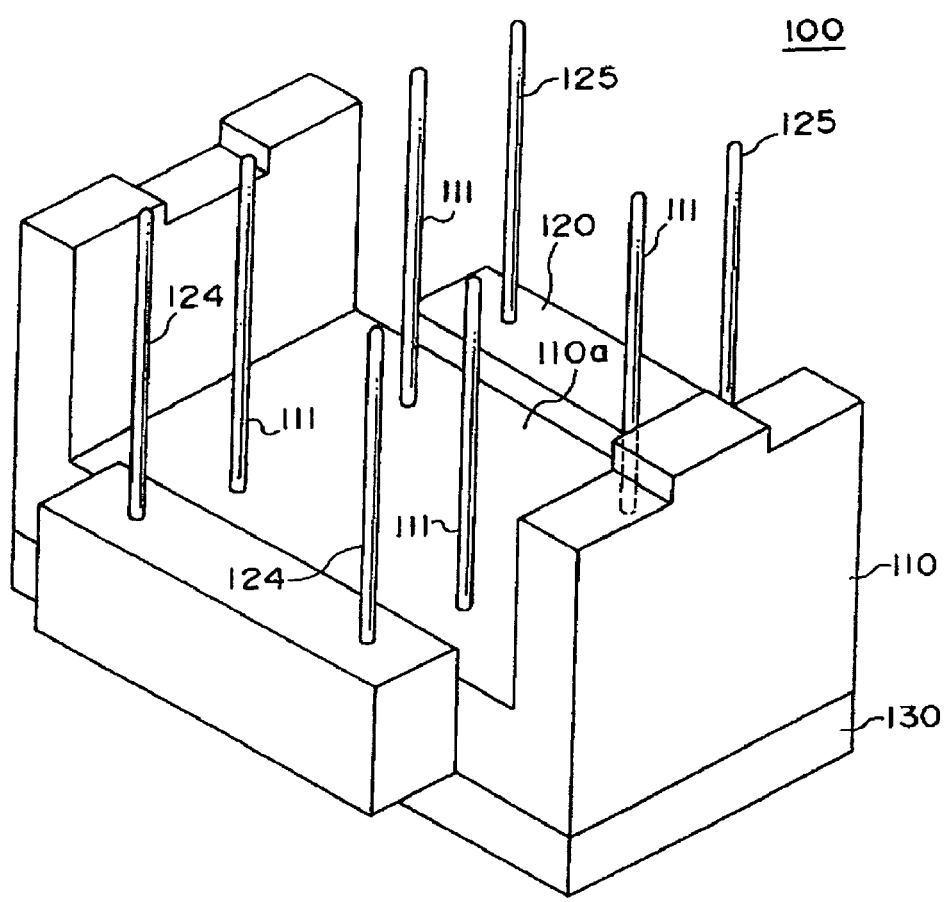
FIG. 2 is a schematic oblique view of the electrochemical device manufacturing jig 100 in its assembled state.

FIG. 1 is a schematic, exploded oblique view of the structure of the electrochemical device manufacturing jig 100 according to a preferred embodiment of the present invention, and FIG. 2 is a schematic oblique view of the electrochemical device manufacturing jig 100 in its assembled state.

As shown in FIGS. 1 and 2, the electrochemical device manufacturing jig 100 according to this embodiment is made up of a first fixing jig 110, a second fixing jig 120, and a fixing pin hold-down jig 130, and is used in a state in which these components are fitted together.

The first fixing jig 110 has four fixing pins 111 that protrude perpendicularly from the upper face 110a of this jig, and has a recess portion 112 formed on its rear face 110b. Meanwhile, the second fixing jig 120 includes first and second portions 121 and 122, and a third portion 123 that links the first and second portions 121 and 122. Two positioning pins 124 are provided protruding perpendicularly from the upper face 121a of the first portion 121, and two positioning pins 125 are provided protruding perpendicularly from the upper face 122a of the second portion 122.

The recess portion 112 provided to the first fixing jig 110 has a shape that mates with the third portion 123 of the second fixing jig 120. The width W1 of the first fixing jig 110 is substantially the same as, or slightly less than, the width W2 of the third portion 123 of the second fixing jig 120. Accordingly, these components can be assembled such that the first fixing jig 110 is on the upper side and the second fixing jig 120 is on the lower side, as shown in FIG. 2, by mating the first and second fixing jigs 110 and 120 in a direction parallel to the axial direction of the fixing pins 111 and the positioning pins 124 and 125. This integrates the first fixing jig 110 and the second fixing jig 120, resulting in a state in which the relative positional relationship of the fixing pins 111 and the positioning pins 124 and 125 is fixed. The phrase "upper side" here refers to the free end side of the fixing pins 111 or the positioning pins 124 and 125, while "lower side" refers to the fixed end side of the fixing pins 111 or the positioning pins 124 and 125.

The first and second fixing jigs 110 and 120 preferably have a shape such that the upper faces 121a and 122a of the second fixing jig 120 are somewhat higher than the upper face 110a of the first fixing jig 110. The step that this produces can be utilized in the positioning of the integration fixing plate (discussed below). Therefore, the width W1 of the first fixing jig 110 must be set somewhat greater than the width of the integration fixing plate and the width of the separators included in the electrochemical device to be produced. There are no particular restrictions on the length of the fixing pins 111 or the positioning pins 124 and 125, except that it must be greater than the thickness of the electrochemical device to be produced.

Figure 3:
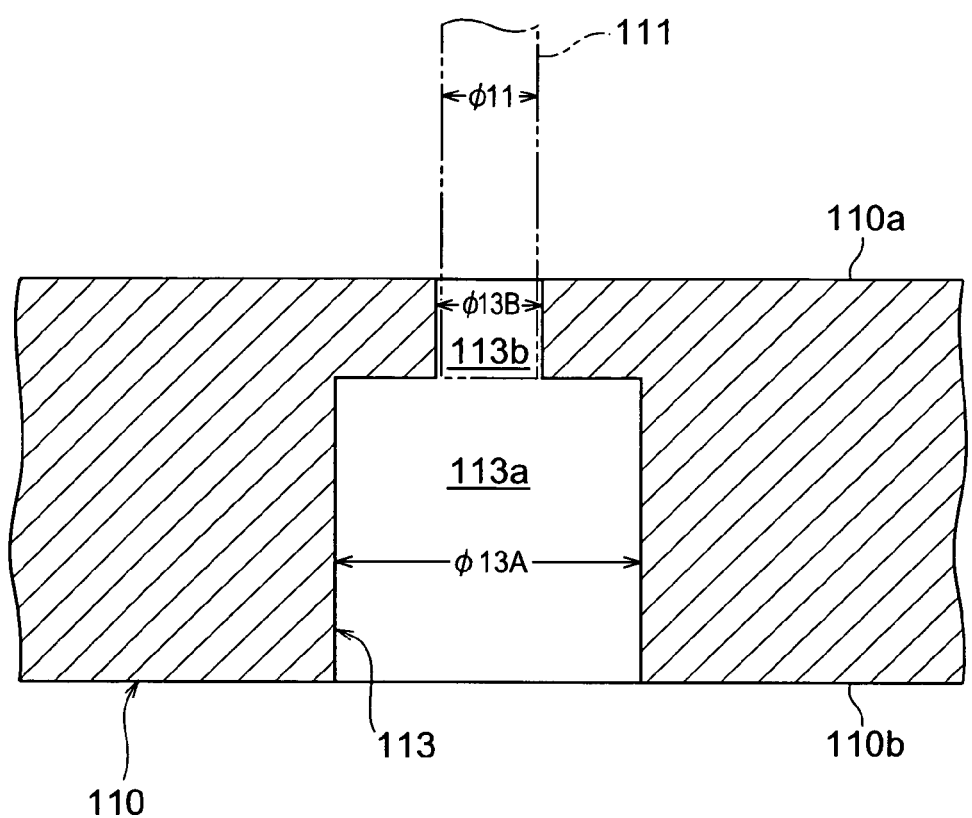
FIG. 3 is a partial cross sectional view of a first fixing jig 110 that is part of the electrochemical device manufacturing jig 100.

The fixing pins 111 are designed so that they can be attached to and removed from the first fixing jig 110. That is, pin insertion holes 113 are formed at positions corresponding to the four fixing pins 111 in the rear face 110b of the first fixing jig 110, and the fixing pins 111 are inserted through these pin insertion holes 113. As shown in FIG. 3, the pin insertion holes 113 are made up of a first portion 113a on the rear face 110b side of the first fixing jig 110, and a second portion 113b on the upper face 110a side. The fixing pins 111 are passed through the first portion 113a and second portion 113b of the pin insertion holes 113 until they stick out from the rear face 110b side of the first fixing jig 110 to the upper face 110a side. The diameter Ø13B of the second portion 113b of the pin insertion holes 113 is set to be either substantially the same as or somewhat larger than the diameter Ø11 of the fixing pins 111 provided to the first fixing jig 110. The diameter Ø13A of the first portion 113a of the pin insertion holes 113 is set to be sufficiently larger than the diameter Ø11 of the fixing pins 111 provided to the first fixing jig 110.

The fixing pins 111 are supported by the fixing pin hold-down jig 130. As shown in FIG. 1, the fixing pin hold-down jig 130 has a flat part 131 and four protruding parts 132, and these four protruding parts 132 are provided at positions corresponding to the pin insertion holes 113 provided to the first fixing jig 110. Accordingly, when the fixing pin hold-down jig 130 is fitted to the rear face 110b of the first fixing jig 110, the four protruding parts 132 provided to the fixing pin hold-down jig 130 push up the ends of the corresponding fixing pins 111, and this results in the fixing pins 111 being supported by the first fixing jig 110.

Protruding portions 114 and recess portions 115 are provided on both sides in the longitudinal direction of the upper face 110a of the first fixing jig 110. These protruding portions 114 and recess portions 115 are utilized to position the hold-down jig (discussed below), and are also utilized to position the integration fixing plate (discussed below).

Next, the various elements of the electrochemical device produced using the electrochemical device manufacturing jig 100 according to this embodiment will be described using an electric double-layer capacitor as an example.

The electric double-layer capacitor produced using the electrochemical device manufacturing jig 100 comprises a collector having polarizable electrode layers formed on both surfaces, a separator that separates adjacent polarizable electrode layers, and an integration fixing plate.

Figure 4:
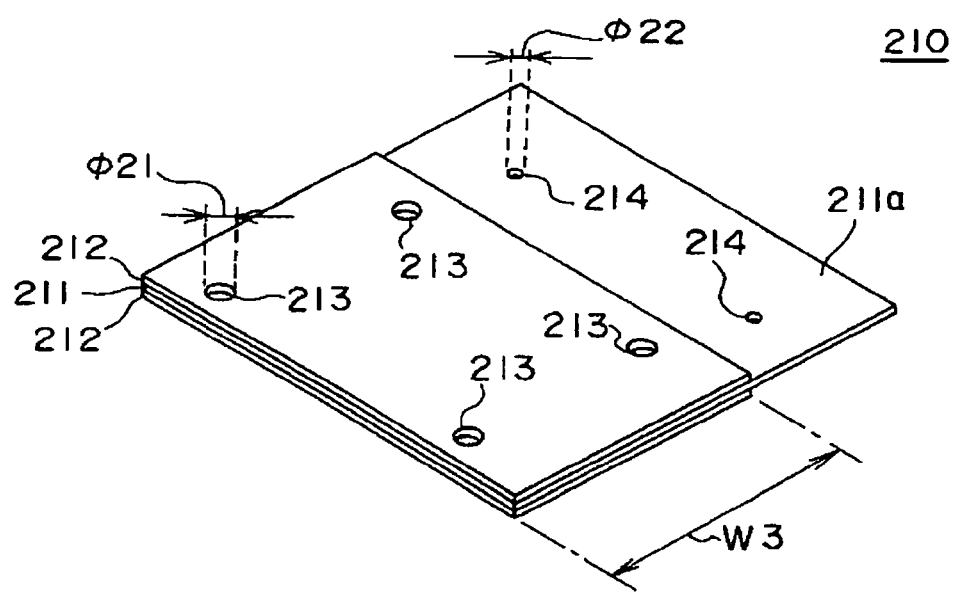
FIG. 4 is a schematic oblique view of the structure of a collector 210.

FIG. 4 is a schematic oblique view of the structure of a collector 210.

As shown in FIG. 4, the collector 210 is in the form of a plate made up of a collector main body 211 and polarizable electrode layers 212 formed on both surfaces thereof. There are no particular restrictions on the material of the collector main body 211 as long as it is a good conductor that allows adequate movement of charges to the polarizable electrode layers 212, and any collector material that is used in known electric double-layer capacitors can be used, such as aluminum (Al). Although there are no particular restrictions, the surfaces of the collector main body 211 is preferably roughened, as this improves adhesion between the collector main body 211 and the polarizable electrode layers 212. There are no particular restrictions on how the surfaces of the collector main body 211 are roughened, but this roughening can be accomplished by chemical etching with an acid or other such chemical.

There are no particular restrictions on the thickness of the collector main body 211, but it is preferably as thin as possible, while still affording enough mechanical strength, in order to make the resulting electric double-layer capacitor more compact. More specifically, if aluminum (Al) is used as the material of the collector main body 211, its thickness is preferably set to at least 10 μm and no more than 100 μm, with at least 15 μm and no more than 50 μm being even better. Setting the thickness of the collector main body 211 composed of aluminum (Al) to within this range ensures adequate mechanical strength while also allowing the electric double-layer capacitor that is ultimately produced to be more compact.

The polarizable electrode layers 212 contribute to the storage and release of electrical charges, and are preferably formed by coating the surface of the collector main body 211. The polarizable electrode layers 212 contain as their constituent materials at least porous particles that have electron conductivity, and a binder capable of binding these porous particles together. Also, in addition to the porous particles and binder, the polarizable electrode layers 212 preferably contain a conduction auxiliary agent having electron conductivity.

There are no particular restrictions on the porous particles contained in the polarizable electrode layers 212 as long as they are porous particles having electron conductivity that contributes to the storage and release of electrical charges, but an example is activated carbon that has undergone an activation treatment and is in the form of granules or fibers. This activated carbon can be phenol-based activated carbon, coconut shell activated carbon, or the like. The average size of these porous particles is preferably from 3 to 20 µm, and the BET specific surface area as measured by BET isothermal adsorption from a nitrogen adsorption isotherm is preferably at least 1500 m$^2$/g, and even more preferably 2000 to 2500 m$^2$/g. A high volumetric capacity can be obtained if such porous particles are used.

There are no particular restrictions on the bind contained in the polarizable electrode layers 212 as long as it is a binder capable of binding the above-mentioned porous particles together, but polytetrafluoroethylene (PTFE), polyvinylidene fluoride (PVDF), fluororubbers, and other such fluorine-based binders can be used favorably. This is because fluorine-based binders are electrochemically superior to cellulose binders and acrylic binders because of the difference in the bonding energy of C—F and C—H, for example. Of fluorine-based binders, fluororubbers are preferred. This is because using a fluororubber allows the porous particles to be sufficiently bound together even when contained in a small amount, and this increases the coating film strength of the polarizable electrode layers 212 and also increases the size of the double-layer interface, and raises the volumetric capacity. Another reason is that a fluororubber is electrochemically stable.

Examples of fluororubbers include copolymers of vinylidene fluoride, hexafluoropropylene, and tetrafluoropropylene (VDF-HFP-TFE), copolymers of vinylidene fluoride and hexafluoropropylene (VDF-HFP), copolymers of vinylidene fluoride and pentafluoropropylene (VDF-HFP-TFE), copolymers of vinylidene fluoride, pentafluoropropylene, and tetrafluoropropylene (VDF-PFP-TFE), copolymers of vinylidene fluoride, perfluoromethylvinyl ether, and tetrafluoroethylene (VDF-PFMVE-TFE), copolymers of vinylidene fluoride and chlorotrifluoroethylene (VDF-CTFE), copolymers of ethylene and tetrafluoroethylene, and copolymers of propylene and tetrafluoroethylene. Of these, a fluororubber produced by copolymerizing at least two materials selected from the group consisting of VDF, HFP, and TFE is preferable, and a VDF-HFP-TFE copolymer produced by copolymerizing three members of the above-mentioned group is particularly favorable because it will tend to have better adhesion and chemical resistance.

There are no particular restrictions on the above-mentioned conduction auxiliary agent contained as needed in the polarizable electrode layers 212, as long as it has enough electron conductivity that the movement of electrical charges between the collector main body 211 and the polarizable electrode layers 212 can proceed sufficiently, but using carbon black or graphite, for example, is favorable.

Examples of carbon black include acetylene black, ketjen black, and furnace black, of which acetylene black is preferred. The average particle size of the carbon black is preferably from 25 to 50 nm, and the BET specific surface area is preferably at least 50 m$^2$/g, with 50 to 140 m$^2$/g being even better.

Examples of graphite include natural graphite, manmade graphite, and expanded graphite, with manmade graphite being particularly favorable. The average particle diameter of the graphite is preferably 4 to 6 µm, and the BET specific surface area is preferably at least 10 m$^2$/g, with 15 to 30 m$^2$/g being even better.

As shown in FIG. 4, the polarizable electrode layers 212 are not formed over the entire surface of the collector main body 211, and instead have a structure in which the collector main body 211 is exposed at an extension 211a. The width W3 of the region where the polarizable electrode layers 212 are formed must be set somewhat smaller than the width of the separator (discussed below).

Six through-holes 213 and 214 are formed in the collector 210. Of these, the four through-holes 213 are provided in the region where the polarizable electrode layers 212 are formed, while the two through-holes 214 are provided to the extension 211a.

The four through-holes 213 provided to the region where the polarizable electrode layers 212 are formed are through-holes corresponding to the four fixing pins 111 provided to the first fixing jig 110. The diameter Ø21 of the through-holes 213 is set to be sufficiently larger than the diameter Ø11 of the fixing pins 111 provided to the first fixing jig 110. Meanwhile, the two through-holes 214 provided to the extension 211a are through-holes corresponding to the two positioning pins 124 or 125 provided to the second fixing jig 120. The diameter Ø22 of the two through-holes 214 is set to be either substantially the same as or somewhat larger than the diameter Ø12 of the positioning pins 124 or 125 provided to the second fixing jig 120.

Figure 5:
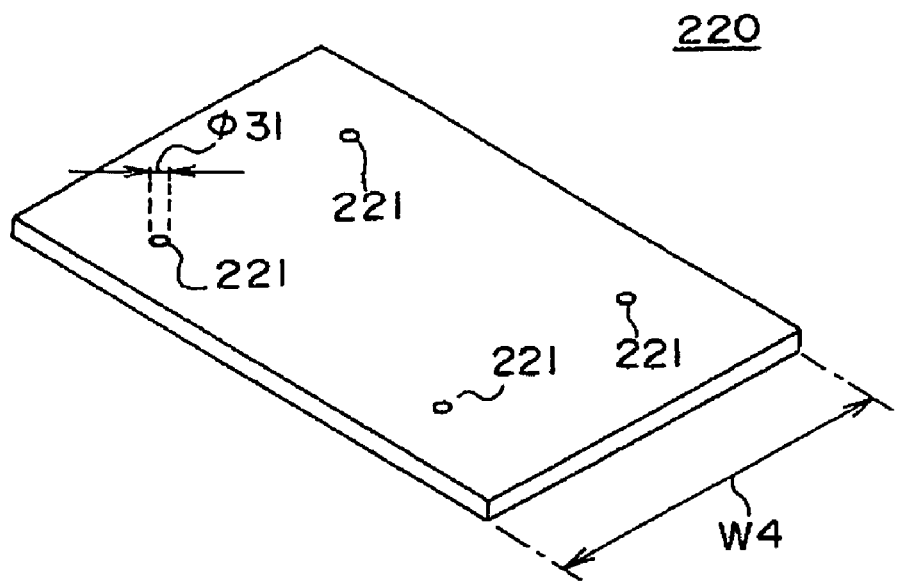
FIG. 5 is a schematic oblique view of the structure of a separator 220.

FIG. 5 is a schematic oblique view of the structure of a separator 220.

The separator 220 is a film that physically separates adjacent polarizable electrode layers 212 while still allowing the movement of an electrolytic solution between adjacent polarizable electrode layers. The separator 220 is preferably formed from an insulating, porous material, examples of which include an integrated film composed of polyethylene, polypropylene, or a polyolefin, a stretched film of a mixture of the above resins, or a nonwoven fabric composed of one or more constituent materials selected from the group consisting of cellulose, polyester, and polypropylene. There are no particular restrictions on the thickness of the separator 220, but at least 15 µm and no more than 200 µm is preferable, and at least 30 µm and no more than 100 µm is even better.

The width W4 of the separator 220, as discussed above, is set to be greater than the width W3 of the region of the collector 210 where the polarizable electrode layers 212 are formed, and to be less than the width W1 of the first fixing jig 110. This is because there is the risk that adjacent polarizable electrode layers 212 will short circuit if the width W4 of the separator 220 is less than the width W3, and because the separator 220 cannot be properly mounted on the first fixing jig 110 if its width W4 is greater than or equal to the width W1.

In addition, four through-holes 221 are formed in the separator 220. These four through-holes 221 correspond to the four fixing pins 111 provided to the first fixing jig 110. The diameter Ø31 of these through-holes 221 is substantially the same as, or slightly greater than, the diameter Ø11 of the fixing pins 111 provided to the first fixing jig 110.

Figure 6:
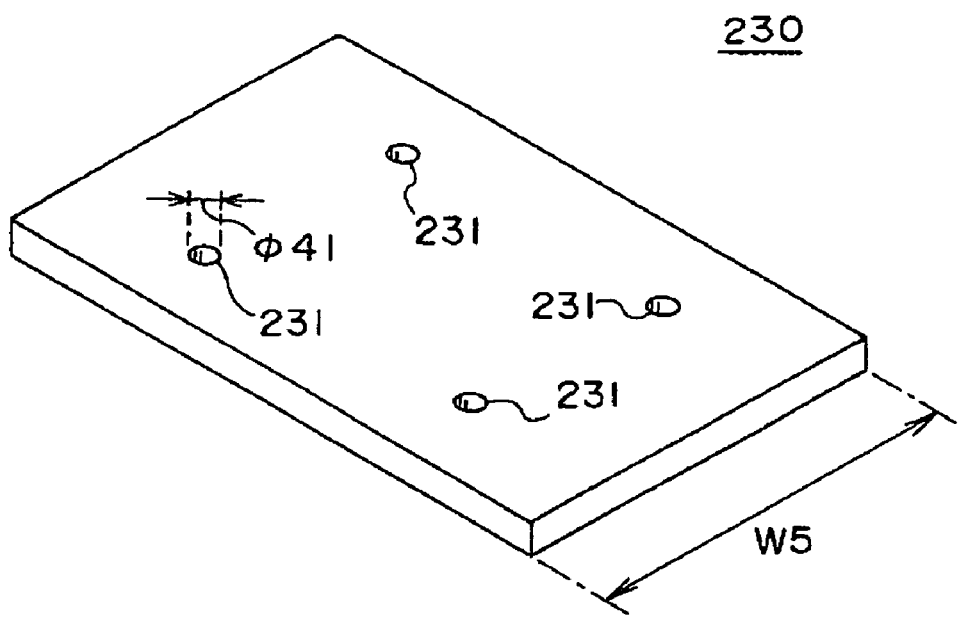
FIG. 6 is a schematic oblique view of the structure of an integration fixing plate 230.

FIG. 6 is a schematic oblique view of the structure of an integration fixing plate 230.

As shown in FIG. 6, the integration fixing plate 230 is in the form of a plate composed of aluminum or the like and in which four through-holes 231 are formed. These four through-holes 231 correspond to the four fixing pins 111 provided to the first fixing jig 110. The diameter Ø41 of these through-holes 231 is set to be slightly greater than the diameter Ø11 of the fixing pins 111 provided to the first fixing jig 110.

The thickness of the integration fixing plate 230 is set to ensure enough strength that the expansion of the polarizable electrode layers that occurs during charging can be held down. The integration fixing plate 230 does not have to be in the form of a flat plate, and may have a structure in which mechanical strength is increased by forming at least a protruding portion and at least a recess portion on the surface of the plate.

The width W5 of the integration fixing plate 230 is set to be greater than the width W4 of the separator 220 and less than the width W1 of the first fixing jig 110. This is because the collector cannot be completely sandwiched if the width W5 of the integration fixing plate 230 is less than the width W4, and because the integration fixing plate 230 cannot be properly mounted on the first fixing jig 110 if its width W5 is greater than or equal to the width W1.

Next, a method for manufacturing an electric double-layer capacitor featuring the electrochemical device manufacturing jig 100 according to this embodiment will be described.

An electric double-layer capacitor featuring the electrochemical device manufacturing jig 100 is produced by alternately laminating the collectors 210 and the separators 220, and disposing a pair of integration fixing plates 230 above and below the collectors. This will be described in more specific terms below.

Figure 7:
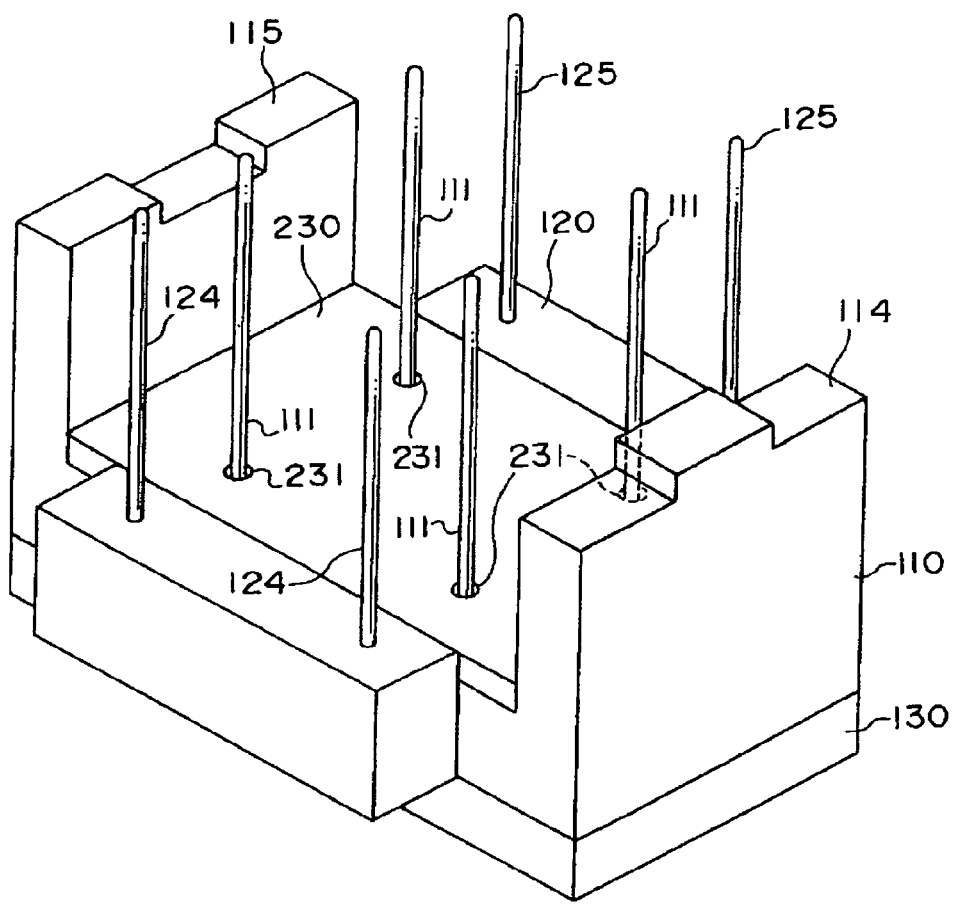
FIG. 7 is a schematic oblique view of a manufacturing step (positioning of integration fixing plate 230) for an electric double-layer capacitor featuring the electrochemical device manufacturing jig 100.

First, as shown in FIG. 7, the first fixing jig 110 and the second fixing jig 120 are integrated by being fitted together. In this state, the fixing pins 111 are inserted into the four pin insertion holes 113 provided to the first fixing jig 110. Then, the fixing pin hold-down jig 130 is attached. At this point, the four protruding portions 132 of the fixing pin hold-down jig 130 are inserted into the four pin insertion holes 113 provided to the first fixing jig 110. This fixes the ends of the fixing pins 111 in the first fixing jig 110. In this state, the integration fixing plate 230 is mounted on the first fixing jig 110 by inserting the corresponding fixing pins 111 into the four through-holes 231 provided to the integration fixing plate 230. The positioning of the integration fixing plate 230 is performed by the step produced between the first fixing jig 110 and the second fixing jig 120 and the protruding portions 114 and recess portions 115 provided to the first fixing jig 110. That is, the position of the integration fixing plate 230 in the width direction is restricted by the step produced between the first fixing jig 110 and the second fixing jig 120, while the position of the integration fixing plate 230 in the longitudinal direction is restricted by the protruding portions 114 and recess portions 115 provided to the first fixing jig 110.

Figure 8:
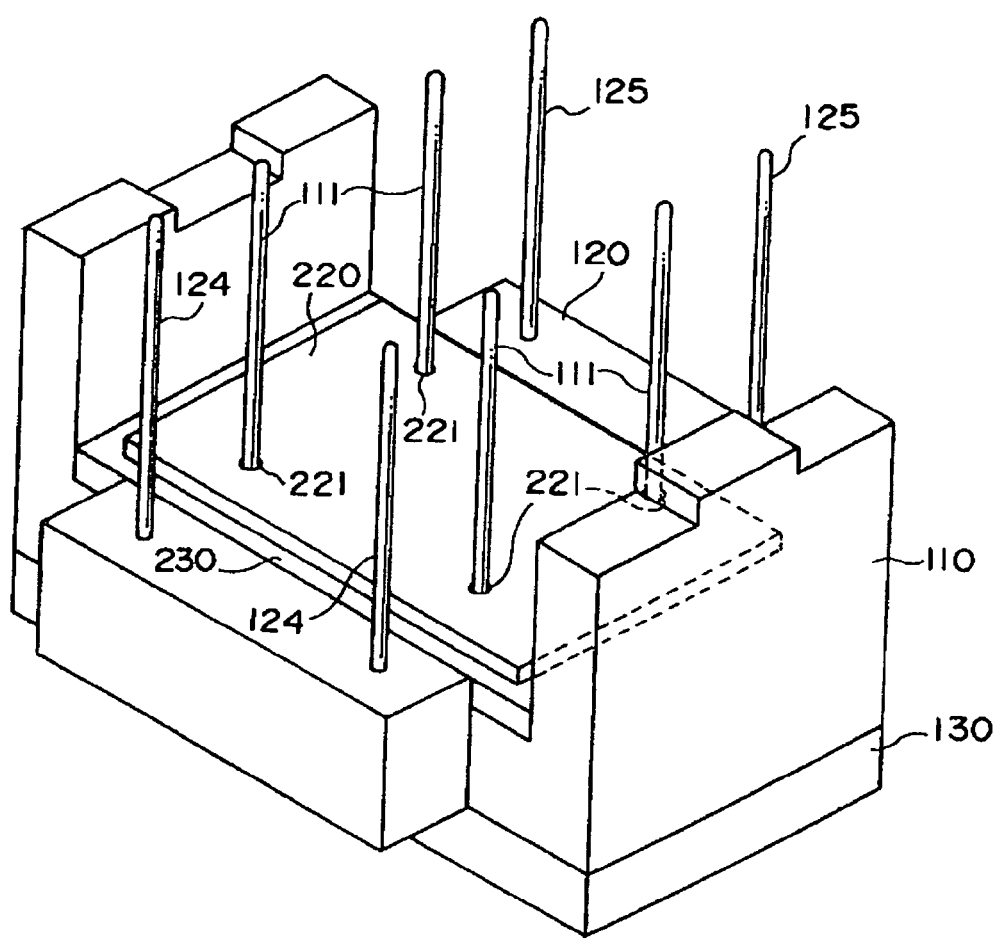
FIG. 8 is a schematic oblique view of a manufacturing step (positioning of separator 220) for an electric double-layer capacitor featuring the electrochemical device manufacturing jig 100.

Next, as shown in FIG. 8, the separator 220 is mounted on the first fixing jig 110 by inserting the corresponding fixing pins 111 in the four through-holes 221 provided to the separator 220. As discussed above, the diameter Ø31 of the through-holes 221 provided to the separator 220 are set to be substantially the same as, or somewhat greater than, the diameter Ø11 of the fixing pins 111, so the separator 220 is mounted in a state of being accurately positioned with respect to the fixing pins 111.

Figure 9:
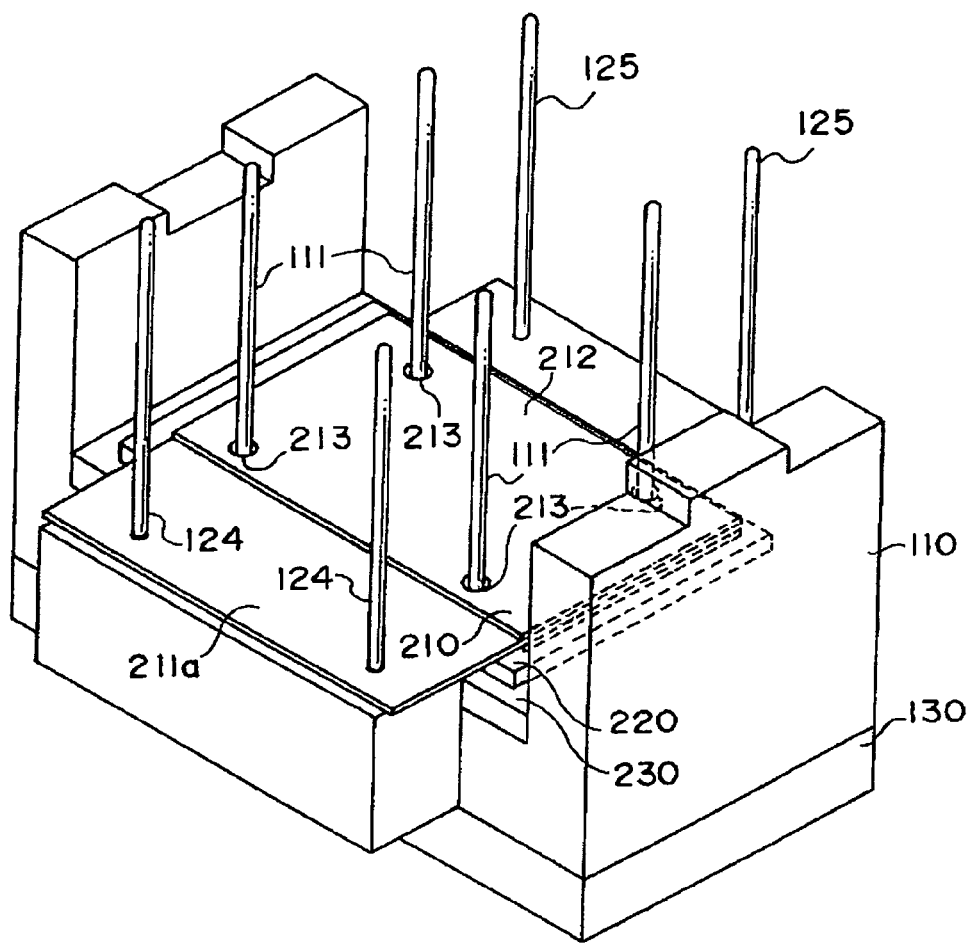
FIG. 9 is a schematic oblique view of a manufacturing step (positioning of collector 210) for an electric double-layer capacitor featuring the electrochemical device manufacturing jig 100.

Next, as shown in FIG. 9, the collector 210 is mounted on the first and second fixing jigs 110 and 120 by inserting the corresponding positioning pins 124 in the two through-holes 214 provided to the extension 211a of the collector 210. At this point, the corresponding fixing pins 111 are inserted in the four through-holes 213 provided to the region where the polarizable electrode layers 212 are formed.

As discussed above, diameter Ø22 of the through-holes 214 provided to the collector 210 is set to be substantially the same as, or somewhat larger than, the diameter Ø12 of the positioning pins 124, so the collector 210 is mounted in a state of being accurately positioned with respect to the positioning pins 124. Meanwhile, because the diameter Ø21 of the through-holes 213 provided to the collector 210 is set to be sufficiently larger than the diameter Ø11 of the fixing pins 111, the fixing pins 111 pass through the collector 210 without coming into contact therewith. Preferably, the inner wall portions of the through-holes 213 and the fixing pins 111 are separated substantially equidistantly all the way around their periphery.

Figure 10:
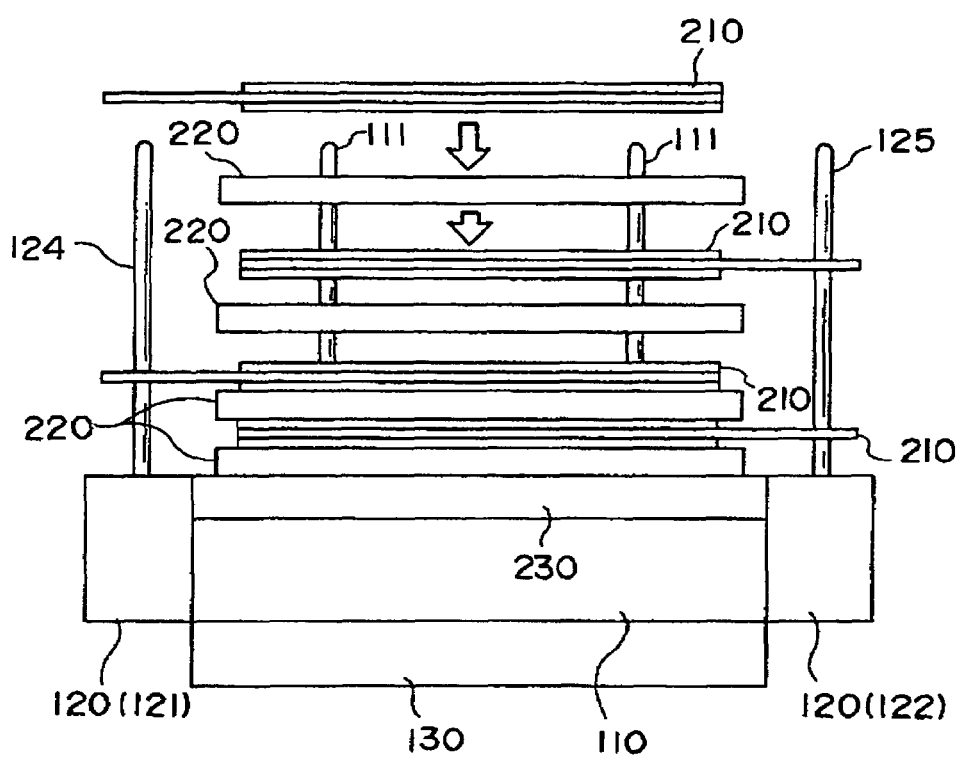
FIG. 10 is a schematic oblique view of a manufacturing step (alternate lamination of collectors 210 and separators 220) for an electric double-layer capacitor featuring the electrochemical device manufacturing jig 100.

Then, as shown in FIG. 10, mounting of the separator 220 and mounting of the collector 210 are repeated alternately. The positioning pins 124 or 125 here must be alternately selected for insertion in the collectors 210. In other words, when a collector 210 is mounted by inserting the positioning pins 124, after a separator 220 has been mounted, another collector 210 is mounted by inserting the positioning pins 125. This is repeated the required number of times to complete an integrated body produced by alternately laminating the collectors 210 and the separators 220. After the integrated body has been thus completed, an integration fixing plate 230 is finally mounted to complete the series of lamination steps.

Figure 11:
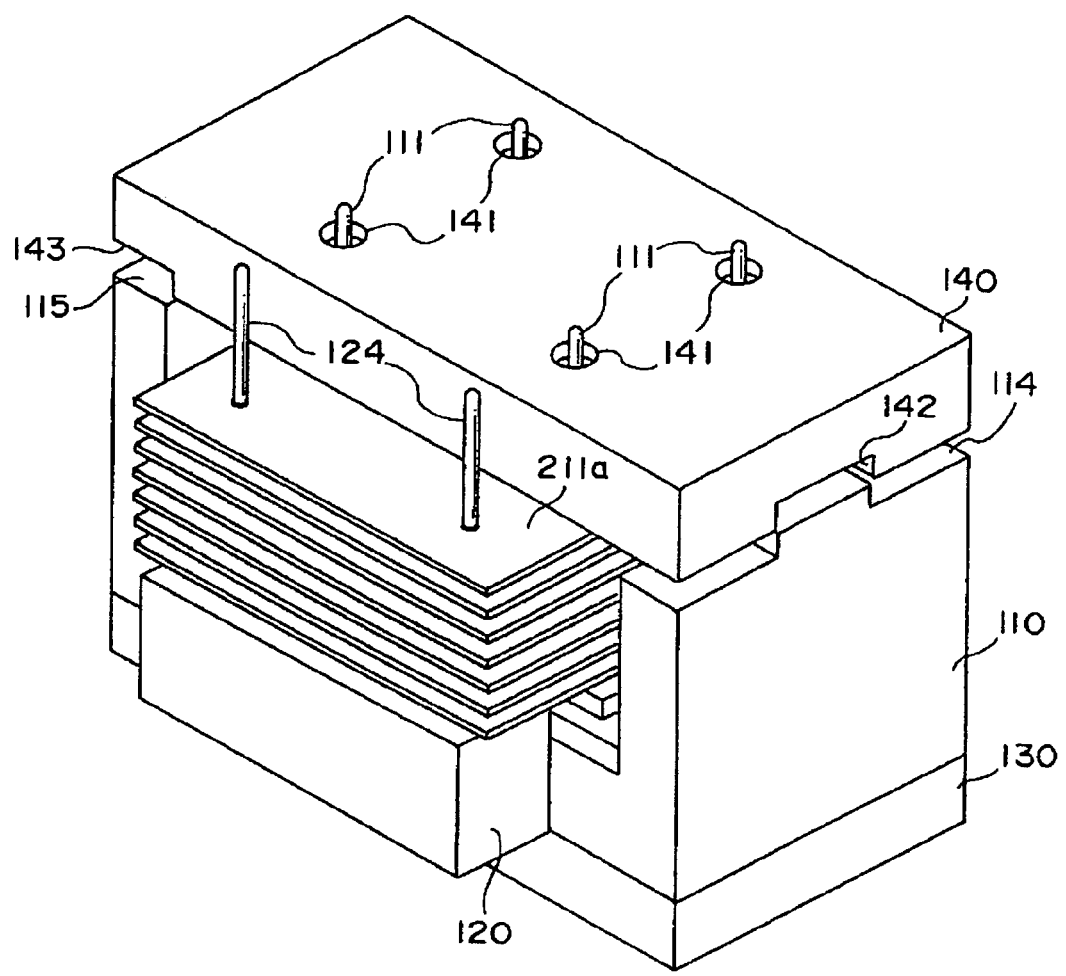
FIG. 11 is a schematic oblique view of a manufacturing step (mounting of hold-down jig 140) for an electric double-layer capacitor featuring the electrochemical device manufacturing jig 100.
Figure 12:
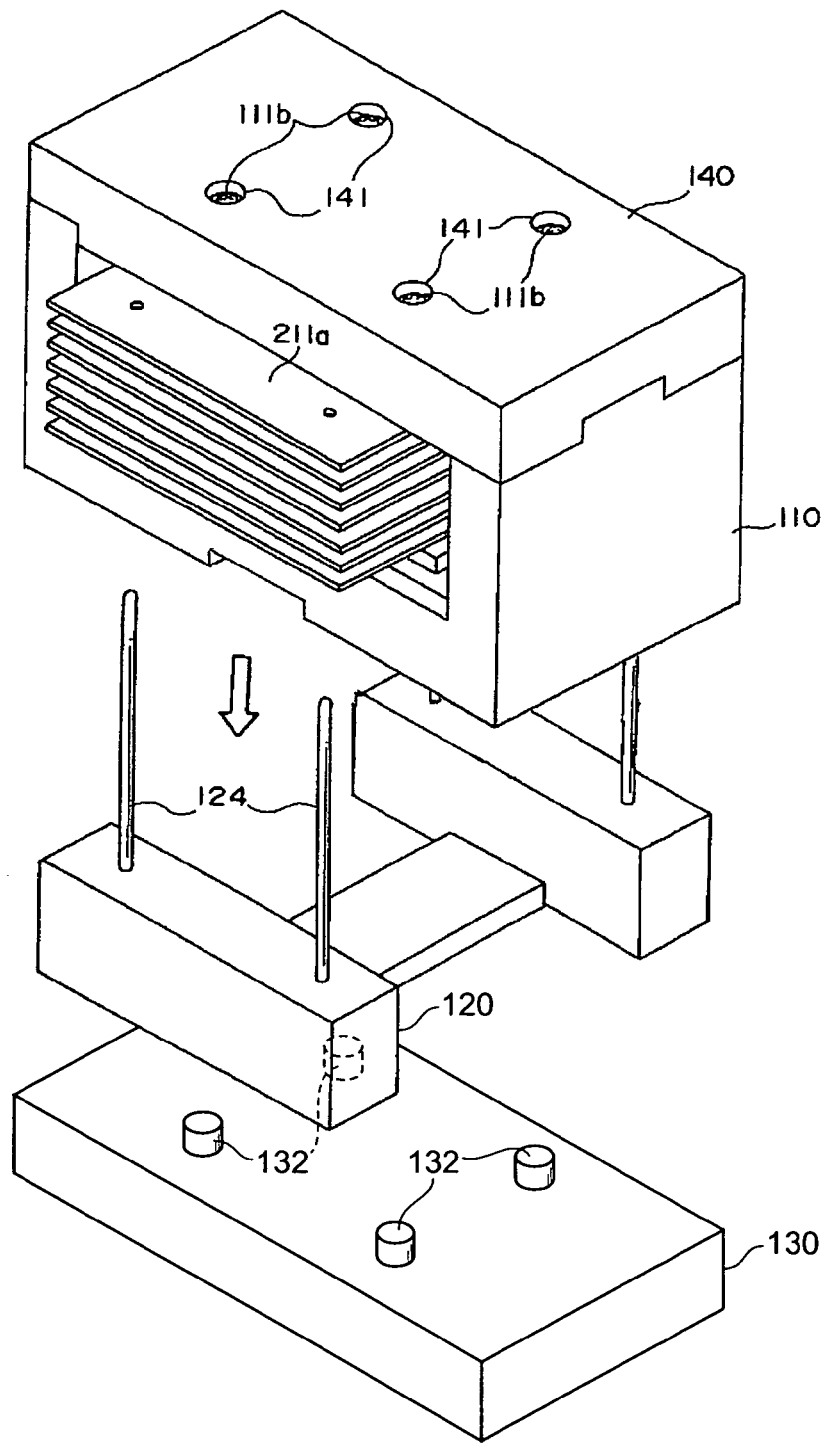
FIG. 12 is a schematic oblique view of a manufacturing step (removal of second fixing jig 120) for an electric double-layer capacitor featuring the electrochemical device. manufacturing jig 100.

After this, as shown in FIG. 11, a hold-down jig 140 in which through-holes 141 are formed at positions corresponding to the fixing pins 111 is placed on top. Recess portions 142 and protruding portions 143 are formed at the ends of the hold-down jig 140 in its longitudinal direction, and the hold-down jig 140 can be placed in the proper position by fitting together these recess portions 142 and protruding portions 143 with the protruding portions 114 and recess portions 115 provided to the first fixing jig 110. The free ends of the fixing pins 111 are then deformed ultrasonically or by some other such means in this state to form heads. As shown in FIG. 12, after the hold-down jig 140 and the fixing pin hold-down jig 130 have been removed, the second fixing jig 120 is removed from the first fixing jig 110. Because the first fixing jig 110 and the second fixing jig 120 are fitted together in the axial direction of the positioning pins 124 and 125, the second fixing jig 120 can be removed by slipping the second fixing jig 120 off in the axial direction of the positioning pins 124 and 125. This pulls the positioning pins 124 and 125 out of the through-holes 214. The integrated body is then removed from the first fixing jig 110. However, the integrated body is removed from the first fixing jig 110 in a state of being integrated with the fixing pins 111. More specifically, the integrated body is removed from the first fixing jig 110 while the heads 111b of the fixing pins 111 are still in contact with the integration fixing plate 230. The ends on the opposite side from the heads 111b of the fixing pins 111 are deformed ultrasonically or by some other such means in this state to form heads.

Figure 13:
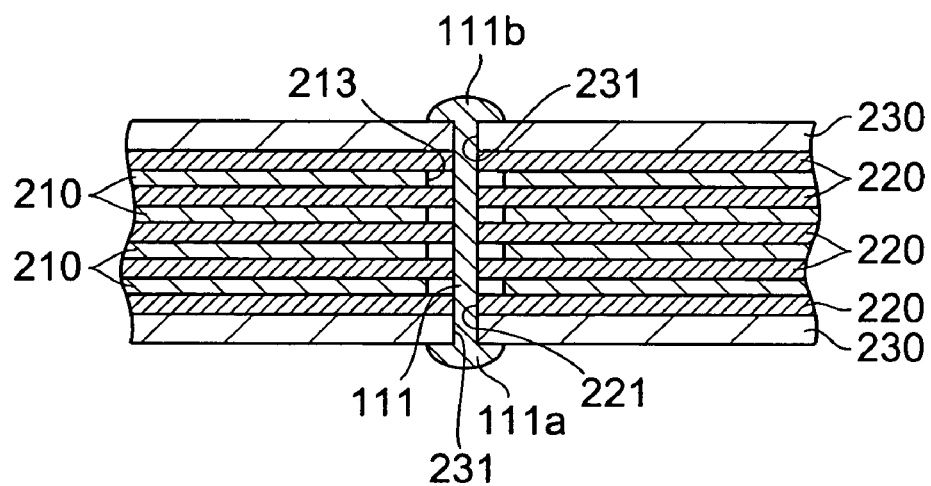
FIG. 13 is a schematic cross sectional view of the structure of an integrated body in a state in which a head 111b has been formed at the free end of a fixing pin 111.

FIG. 13 is a schematic partial cross sectional view of the structure of an integrated body in a state in which heads 111a and 111b have been formed at the ends of a fixing pin 111.

As shown in FIG. 13, when the head 111b is formed at the free end of the fixing pin 111, and the head 111a is formed at the end on the opposite side of the fixing pin 111 from the free end, the pair of integration fixing plates 230 are held down by the heads 111a and 111b, so the integrated body composed of the collectors 210 and separators 220 sandwiched between these plates is compressed and fixed.

As discussed above, of the through-holes 213 and 221 through which the fixing pins 111 pass, the through-holes 221 formed in the separator 220 are set to have a smaller diameter than the through-holes 213 formed in the collector 210. Accordingly, the fixing pins 111 are in a state of contact with the inner walls of the separator 220 substantially all the way around their periphery, but the inner wall portions are separated substantially equidistantly from the collector 210. In other words, there is substantially no contact between the fixing pins 111 and the collector 210. The reason for this is that if the diameter of the through-holes 213 is small, then the material that makes up the polarizable electrode layers 212, for example, will infiltrate into the through-holes 221 provided to the separator 220 when the fixing pins 111 are being inserted into the through-holes 213, and as a result, there is the risk of short circuiting between the pair of electrodes that are supposed to be separated by the separator 220. Consequently, the fixing pins 111 are not suitable for the positioning of the collector 210, and in this embodiment this fact is taken into account and the positioning pins 124 and 125, which are different from the fixing pins 111, are used for the positioning of the collector 210.

Figure 14:
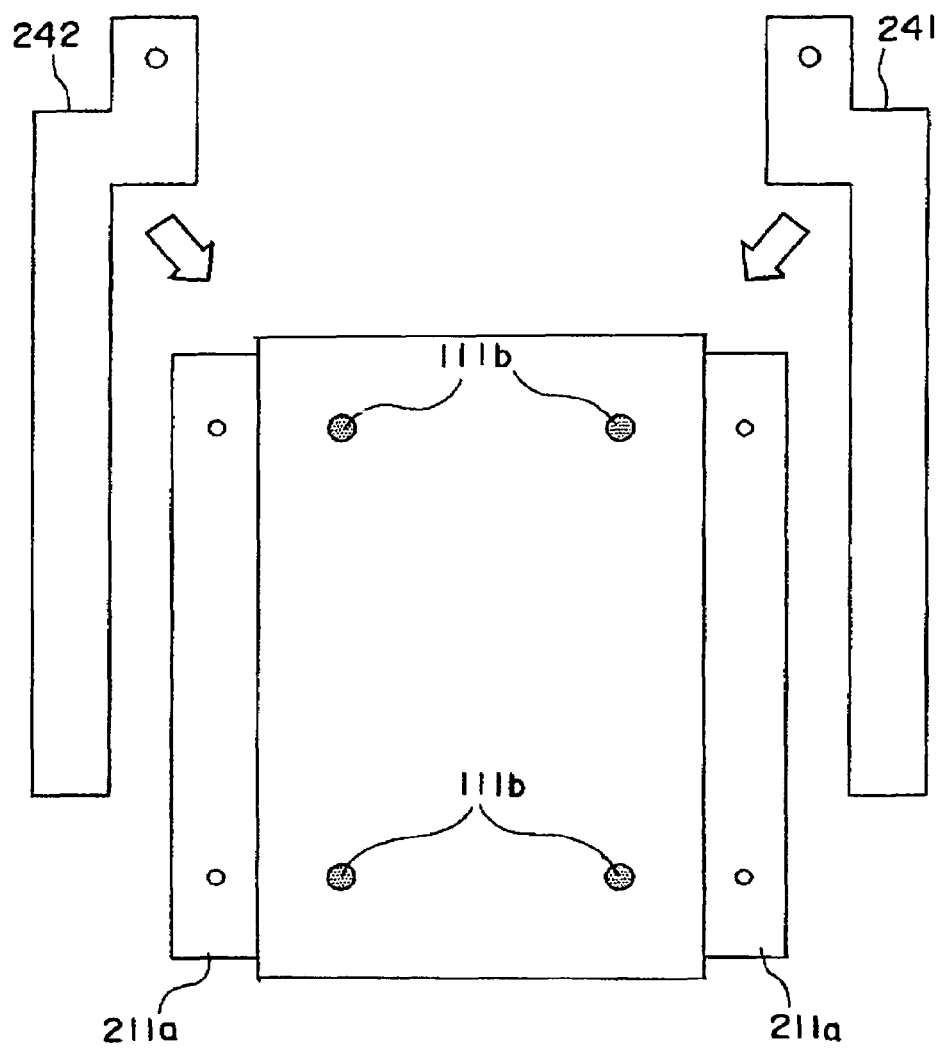
FIG. 14 is a schematic plan view of a manufacturing step (connection of collecting bars 241 and 242) for an electric double-layer capacitor featuring the electrochemical device manufacturing jig 100.

After the heads 111b are thus formed on the free ends of the fixing pins 111, and the heads 111a are formed on the opposite side of the fixing pins 111 from the free ends, the collecting bars 241 and 242 are connected to the extension 211a of the collector 210 to complete an electric double-layer capacitor as shown in FIG. 14, which is a schematic plan view.

Figure 15:
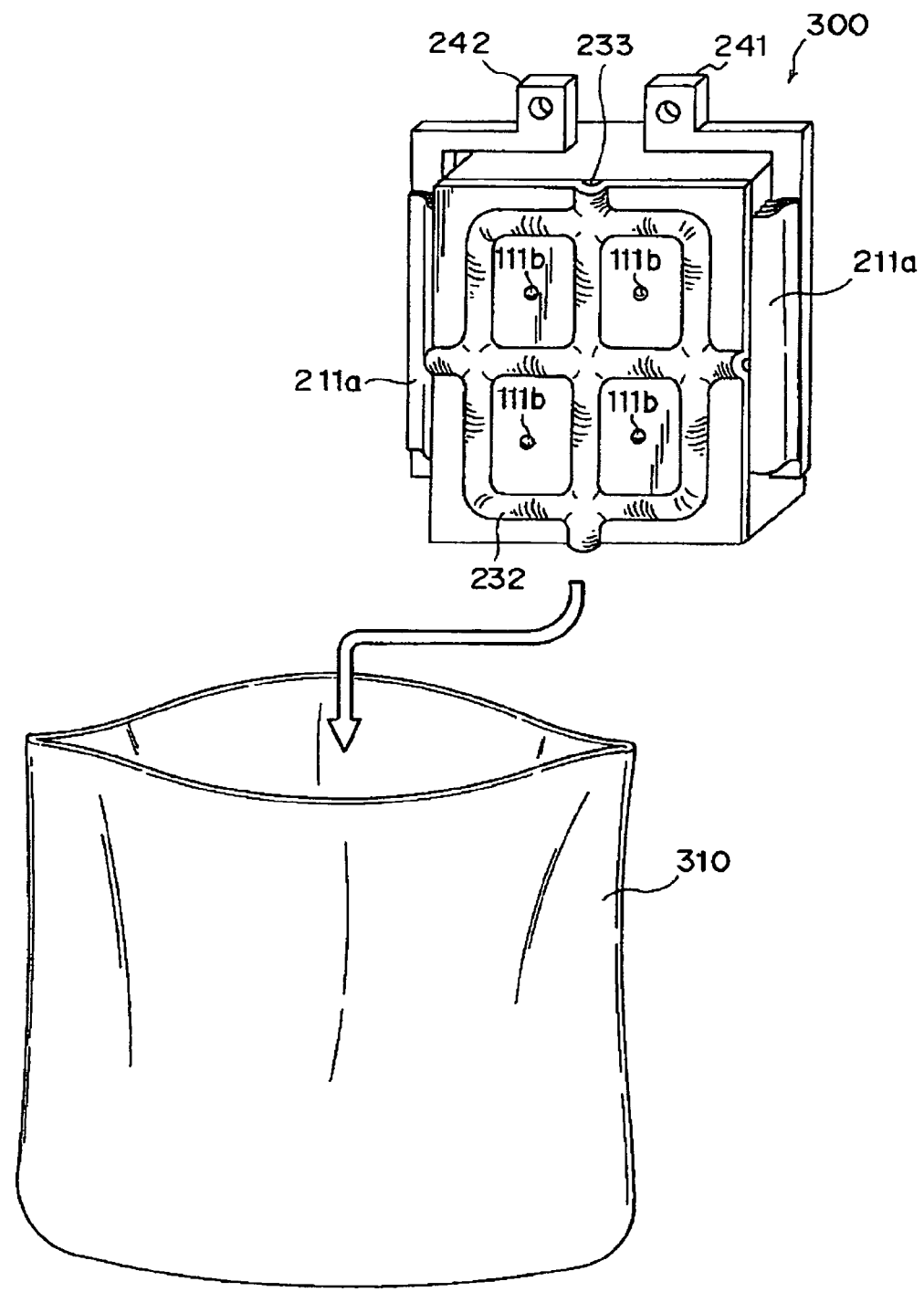
FIG. 15 is a diagram of an electric double-layer capacitor 300 and a sealing bag 310 in which this is sealed.

As shown in FIG. 15, the electric double-layer capacitor 300 produced as above is put in the sealing bag 310, which is filled with an electrolytic solution, and is sealed with part of the collecting bars 241 and 242 exposed. The sealing bag 310 can be an aluminum laminate or the like.

The electrolytic solution here can be any one used in known electric double-layer capacitors (electrolytic aqueous solution, or an electrolytic solution in which an organic solvent is used). However, since the electrolytic solutions used in electric double-layer capacitors have an electrochemically low decomposition voltage, the withstand voltage of the capacitor is kept low, so it is preferable to use an electrolytic solution in which an organic solvent is used (a nonaqueous electrolytic solution). There are no particular restrictions on the specific type of electrolytic solution used, but it is preferably selected by taking into account the solubility of the solute, the degree of dissociation, and the viscosity of the liquid, and it is particularly favorable for it to be an electrolytic solution with high conductivity and a high potential window (decomposition begins at a high voltage). Typical examples include a solution obtained by dissolving a quaternary ammonium salt such as tetraethyl ammonium tetrafluoroborate in an organic solvent such as propylene carbonate, diethylene carbonate, or acetonitrile. In this case, the amount of water that is admixed must be strictly managed.

Then, the electric double-layer capacitor 300 and its sealing bag 310 are put into a container (such as a plastic case; not shown) to obtain a finished product.

As described above, when an electric double-layer capacitor is produced using the electrochemical device manufacturing jig 100 according to this embodiment, the separators 220 are positioned by the fixing pins 111, and the collectors 210 are positioned by the positioning pins 124 and 125. In other words, the collectors 210 are not positioned by the fixing pins 111, and the fixing pins 111 can be in a state of being separated from the inner wall portions of the through-holes 213 provided to the collectors 210. As a result, even though the fixing pins 111 are provided passing through the collectors 210 and the separators 220, there is no risk that the electrodes above and below will short circuit through these.

Also, the heads 111b are formed on these fixing pins 111 after lamination, and this allows the fixing pins 111 to have the function of compressing and fixing the integrated body. Accordingly, even if the polarizable electrode layers 212 should expand due to repeated charging and discharging in an actual usage state, because the integration fixing plates 230 provided above and below are held down by the fixing pins 111, the expansion of the integrated body is also head down, and as a result it is possible to prevent deformation.

Furthermore, as shown in FIG. 15, if the integration fixing plate 230 is shaped such that it has a protruding portion 232 extending to the ends, then a space 233 can be formed between the integrated body and the integration fixing plate 230, and this space will serve as an inlet for the electrolytic solution. This makes it easier for the electrolytic solution to move all the way into the interior of the integrated body. Also, if a protruding portions and recess portions are provided to the integration fixing plate 230, the mechanical strength of the integration fixing plate itself will be higher, so expansion of the polarizable electrode layers 212 can be held down more effectively.

Second Embodiment

A second embodiment of the present invention will now be described in detail.

Figure 16:
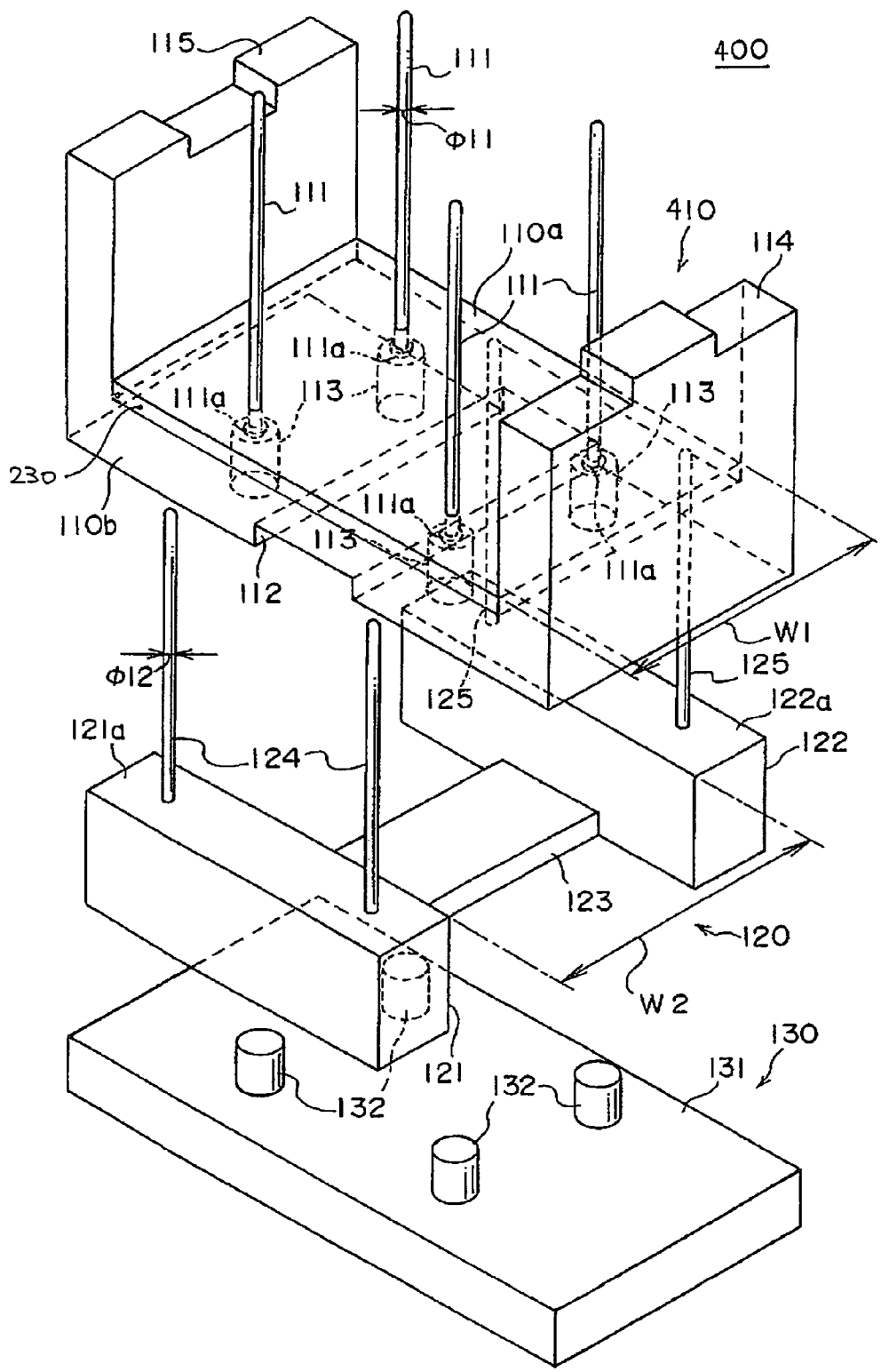
FIG. 16 is a schematic, exploded oblique view of the structure of an electrochemical device manufacturing jig 400 according to a second embodiment of the present invention.
Figure 17:
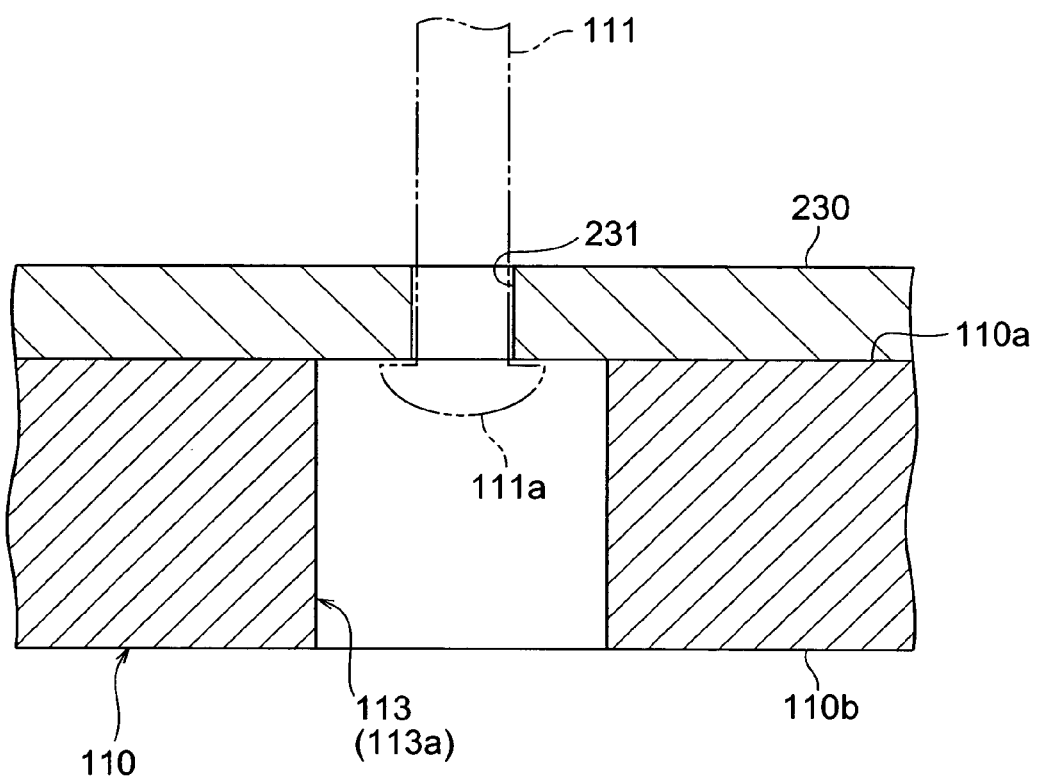
FIG. 17 is a partial cross sectional view of a first fixing jig 110 that is part of the electrochemical device manufacturing jig 400.

FIG. 16 is a schematic, exploded oblique view of the structure of an electrochemical device manufacturing jig 400 according to the second embodiment of the present invention. FIG. 17 is a partial cross sectional view of the first fixing jig 110 that is part of the electrochemical device manufacturing jig 400. As shown in FIGS. 16 and 17, the electrochemical device manufacturing jig 400 of this embodiment first of all differs from the electrochemical device manufacturing jig 100 of the first embodiment in that the four pin insertion holes 113 provided to the first fixing jig 110 are each made up of just a first portion 113a, and the first fixing jig 110 further has an integration fixing plate 230 on the upper face 110a. Here, the positions of the through-holes 231 provided to the integration fixing plate 230 coincide with the positions of the pin insertion holes 113 provided to the first fixing jig 110. The diameter Ø41 of the through-holes 231 provided to the integration fixing plate 230 is set to be substantially the same as, or slightly larger than, the diameter Ø11 of the fixing pins 111 provided to the first fixing jig 110. The diameter Ø13A of the pin insertion holes 113 is set to be sufficiently larger than the diameter Ø11 of the fixing pins 111 provided to the first fixing jig 110.

Second, the electrochemical device manufacturing jig 400 of this embodiment also differs from the electrochemical device manufacturing jig 100 of the first embodiment in having heads 111a on the fixed end side of the fixing pins 111.

Next, a method for manufacturing an electric double-layer capacitor using the electrochemical device manufacturing jig 400 according to this embodiment will be described. Description that is redundant to the first embodiment will be omitted as necessary.

An electric double-layer capacitor featuring the electrochemical device manufacturing jig 400 is produced by alternately laminating the collectors 210 and the separators 220, and disposing an integration fixing plate 230 on the integrated body. This will be described more specifically below.

First, a separator 220 is mounted on the first fixing jig 110, and a collector 210 is mounted over the separator 220. After this, the separators 220 and collectors 210 are alternately laminated to complete an integrated body in which the collectors 210 and the separators 220 are alternately laminated. After the integrated body has been completed in this manner, a final integration fixing plate 230 is mounted to complete the series of lamination steps.

After this, a hold-down jig 140 in which through-holes 141 are formed at positions corresponding to the fixing pins 111 is placed on top. Recess portions 142 and protruding portions 143 provided to the hold-down jig 140 are mated with protruding portions 114 and recess portions 115 provided to the first fixing jig 110. A torque wrench or the like is used to apply pressure between the first fixing jig 110 and the hold-down jig 140 in this state. The pressure applied is set to about 5 to 7N/cm$^2$, for example. This exerts a high pressure to the integrated body so that it is compressed. Heads 111b are then formed by deforming the free ends of the fixing pins 111 ultrasonically or by some other such means.

Here, heads 111a have already been formed on the ends of the fixing pins 111 on the opposite side from the heads 111b. Therefore, when the heads 111b are formed on the free ends of the fixing pins 111, the pair of integration fixing plates 230 are held down by the heads 111a and 111b, so the integrated body composed of the collectors 210 and separators 220 sandwiched between these plates is compressed and fixed in this state.

After the heads 111b have been formed in this way on the free ends of the fixing pins 111, first the third fixing pin hold-down jig 130 and then the second fixing jig 120 are removed. Because the first fixing jig 110 and the second fixing jig 120 are fitted together in the axial direction of the positioning pins 124 and 125, the second fixing jig 120 can be removed by slipping the second fixing jig 120 off in the axial direction of the positioning pins 124 and 125. This pulls the positioning pins 124 and 125 out of the through-holes 214.

Figure 18:
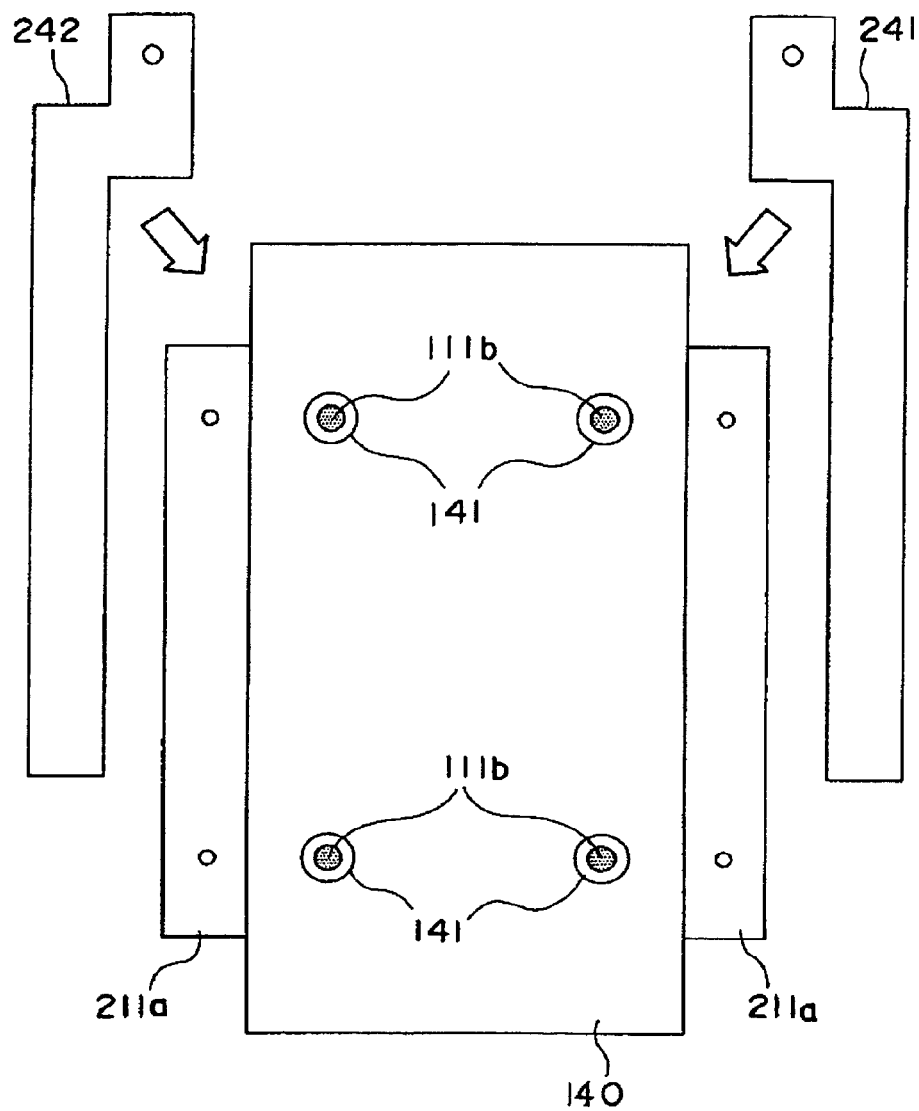
FIG. 18 is a schematic oblique view of a manufacturing step (connection of collecting bars 241 and 242) for an electric double-layer capacitor featuring the electrochemical device manufacturing jig 400.

After the positioning pins 124 and 125 have thus been pulled out of the through-holes 214, the electric double-layer capacitor is completed by connecting the collecting bars 241 and 242 to the extension 211a of the collector 210 and removing the first fixing jig 110 and the hold-down jig 140, as shown in FIG. 18, which is a schematic plan view.

The electric double-layer capacitor 300 produced as above is put in the sealing bag 310, which is filled with an electrolytic solution, and is sealed with part of the collecting bars 241 and 242 exposed (see FIG. 15).

As described above, when an electric double-layer capacitor is produced using the electrochemical device manufacturing jig 400 according to this embodiment, the separators 220 are positioned by the fixing pins 111, and the collectors 210 are positioned by the positioning pins 124 and 125. In other words, the collectors 210 are not positioned by the fixing pins 111, and the fixing pins 111 can be in a state of being separated from the inner wall portions of the through-holes 213 provided to the collectors 210. As a result, even though the fixing pins 111 are provided passing through the collectors 210 and the separators 220, there is no risk that the electrodes above and below will short circuit through these.

Also, the heads 111b are formed on these fixing pins 111 after lamination, and this allows the fixing pins 111 to have the function of compressing and fixing the integrated body, along with the heads 111a. Accordingly, even if the polarizable electrode layers 212 should expand due to repeated charging and discharging in an actual usage state, because the integration fixing plates 230 provided above and below are held down by the fixing pins 111, the expansion of the integrated body is also head down, and as a result it is possible to prevent deformation.

Preferred embodiments of the present invention were described above, but the present invention is not limited to the first and second embodiments given above, and various modifications are possible without exceeding the gist of the present invention, and it should go without saying that these modifications are also encompassed by the scope of the present invention.

For example, the electrochemical device manufacturing jig 100 according to the first embodiment above was equipped with four fixing pins 111 and two each of the positioning pins 124 and 125 on the left and right, but the number of fixing pins and positioning pins in the present invention is not limited to these. Also, of the second fixing jig 120, the first portion 121 having the positioning pins 124 and the second portion 122 having the positioning pins 125 do not have to be contiguous, and these may instead be constituted by separate members.

Also, the electrochemical devices that can be manufactured with the present invention are not limited to electric double-layer capacitors, and various other electrochemical capacitors such as pseudo-capacity capacitors, pseudo-capacitors, and redox capacitors can also be produced.

What is claimed is:

1. An electrochemical device, comprising:
   an integrated body produced by alternately disposing a plurality of collectors each having polarizable electrode layers formed on surfaces thereof and a plurality of separators for separating the adjacent polarizable electrode layers;
   a pair of integration fixing plates disposed on both sides of the integrated body in a lamination direction; and
   a plurality of fixing pins that pass through the integrated body and the integration fixing plates, wherein
   the separators and the collectors have first and second through-holes respectively, into which the fixing pins are inserted, with the diameter of the second through-holes being larger than that of the first through-holes.

2. The electrochemical device according to claim 1, wherein the fixing pins are made up of an insulating material.

3. The electrochemical device according to claim 2, wherein the separators are in contact with the fixing pins at the inner wall portions of the first through-holes.

4. The electrochemical device according to claim 3, wherein the inner wall portion of the second through-hole and the fixing pin are separated substantially equidistantly all the way around a periphery thereof.

5. The electrochemical device according to claim 1, wherein the separators are in contact with the fixing pins at inner wall portions of the first through-holes.

6. The electrochemical device according to claim 5, wherein the inner wall portion of the second through-hole and the fixing pin are separated substantially equidistantly all the way around a periphery thereof.

7. A method for manufacturing an electrochemical device, comprising:
   a first step of positioning and placing the separators with respect to fixing pins by inserting the corresponding fixing pins respectively in a plurality of first through-holes provided to the separators;
   a second step of positioning and placing collectors each having polarizable electrode layers formed on surfaces thereof with respect to positioning pins by inserting the corresponding fixing pins respectively in a plurality of second through-holes provided to the collectors, and inserting corresponding positioning pins respectively in a plurality of third through-holes provided to the collectors; and a third step of forming a integrated body by alternately repeating the first and second steps, and then compressing and fixing the integrated body by forming heads at ends of the fixing pins.

8. The method for manufacturing an electrochemical device according to claim 7, wherein the diameter of the second through-holes is larger than that of the first through-holes.

9. The method for manufacturing an electrochemical device according to claim 8, wherein the third through-holes are formed in an extension where no polarizable electrode layer is formed on a surface thereof.

10. The method for manufacturing an electrochemical device according to claim 9, further comprising a fourth step of pulling the positioning pins out of the third through-holes and then connecting a collecting bar to the extension.

11. The method for manufacturing an electrochemical device according to claim 7, wherein the third through-holes are formed in an extension where no polarizable electrode layer is formed on a surface thereof.

12. The method for manufacturing an electrochemical device according to claim 11, further comprising a fourth step of pulling the positioning pins out of the third through-holes and then connecting a collecting bar to the extension.

13. An electrochemical device manufacturing jig, comprising:

a first fixing jig having a plurality of fixing pins, for positioning and fixing separators by inserting the plurality of fixing pins in through-holes provided to the separators; and a second fixing jig having a plurality of positioning pins, for positioning and fixing collectors by inserting the plurality of positioning pins in through-holes provided to the collectors, wherein the first and second fixing jigs are capable of fixing a relative positional relationship of the fixing pins and the positioning pins by mating in a direction parallel to an axial direction of the fixing pins and the positioning pins.

14. The electrochemical device manufacturing jig according to claim 13, wherein when free ends of the fixing pins and the positioning pins are on an upper sides and fixed ends are on a lower side, the first and second fixing jigs can be mated such that the first fixing jig is on the upper side and the second fixing jig is on the lower side.

15. The electrochemical device manufacturing jig according to claim 14, wherein the fixing pins can be attached to and removed from the first fixing jig, and are made of an insulating material.

16. The electrochemical device manufacturing jig according to claim 15, wherein the second fixing jig includes a first portion provided with some of the plurality of positioning pins, a second portion provided with the rest of the plurality of positioning pins, and a third portion that links the first and second portions, and the first fixing jig has a recess portion that mates with the third portion of the second fixing jig.

17. The electrochemical device manufacturing jig according to claim 14, wherein the second fixing jig includes a first portion provided with some of the plurality of positioning pins, a second portion provided with the rest of the plurality of positioning pins, and a third portion that links the first and second portions, and the first fixing jig has a recess portion that mates with the third portion of the second fixing jig.

18. The electrochemical device manufacturing jig according to claim 13, wherein the fixing pins can be attached to and removed from the first fixing jig, and are made of an insulating material.

19. The electrochemical device manufacturing jig according to claim 18, wherein the second fixing jig includes a first portion provided with some of the plurality of positioning pins, a second portion provided with the rest of the plurality of positioning pins, and a third portion that links the first and second portions, and the first fixing jig has a recess portion that mates with the third portion of the second fixing jig.

20. The electrochemical device manufacturing jig according to claim 13, wherein the second fixing jig includes a first portion provided with some of the plurality of positioning pins, a second portion provided with the rest of the plurality of positioning pins, and a third portion that links the first and second portions, and the first fixing jig has a recess portion that mates with the third portion of the second fixing jig.

* * * * *